Patented Sept. 23, 1947

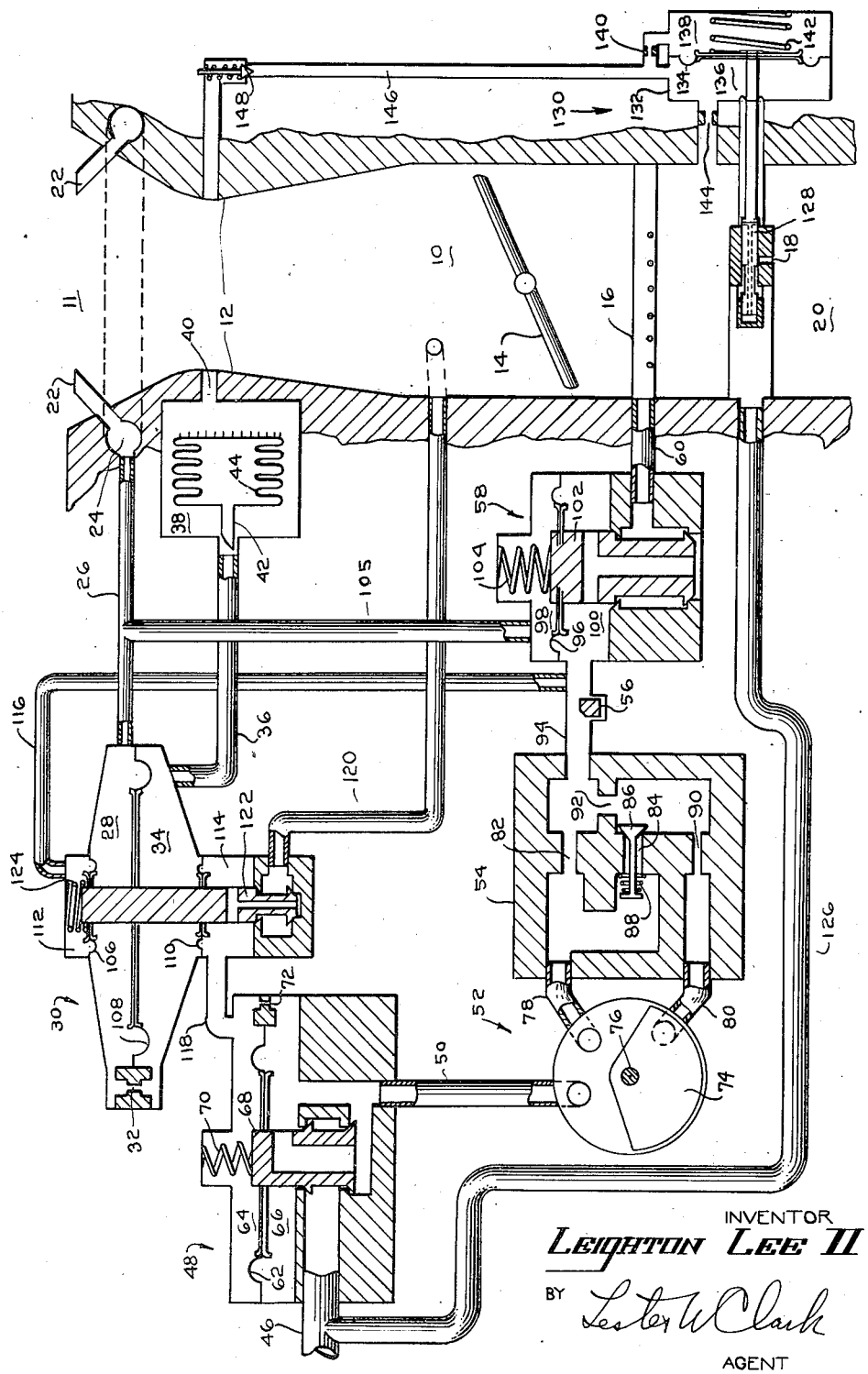

2,427,793

UNITED STATES PATENT OFFICE 2,427,793

FUEL SUPPLY SYSTEM

Leighton Lee, II, Meriden, Conn., assignor, by mesne assignments, to Niles-Bement-Pond Company, West Hartford, Conn., a corporation of New Jersey Application December 13, 1943, Serial No. 514,023

2 Claims. (Cl. 261—69)

The present invention relates to fuel supply systems for internal combustion engines, and particularly to such systems which are provided with means for increasing the fuel supply upon acceleration of the engine.

An object of the present invention is to provide an improved fuel supply system for an internal combustion engine.

Another object is to provide, in a fuel supply system for an internal combustion engine, improved means for increasing the fuel supply upon acceleration of the engine.

Another object is to provide, in such a fuel supply system, means for terminating the increased supply of fuel in accordance with the quantity of air flowing to the engine for combustion purposes.

A further object is to provide, in a fuel supply system of the type described, means for varying the duration of the increased fuel supply during acceleration of the engine in accordance with the particular speed at which the acceleration begins.

Other objects and advantages of the present invention will become apparent from a consideration of the appended specification, claims and drawing, in which the single figure illustrates, somewhat diagrammatically, my invention as applied to a fuel supply system for an internal combustion engine of a type particularly adapted for use in connection with aircraft engines.

Referring to the figure, there is shown a passage 10 for air flowing thru an aircraft carburetor. Air enters the passage 10 at an inlet 11, and flows thru a Venturi restriction 12, past a throttle 14 and a normal fuel discharge nozzle 16, and an accelerating fuel discharge nozzle 18 to an outlet 20.

A second air passage connects the inlet 11 and the throat of Venturi restriction 12. This second passage may be traced from inlet 11 thru a plurality of impact tubes 22, a passage 24 interconnecting the impact tubes, a conduit 26, an expansible chamber 28 in a pressure meter generally indicated at 30, a restriction 32, another expansible chamber 34 in the pressure meter 30, a conduit 36, a chamber 38 and a conduit 40 to the throat of venturi 12.

The flow of air from conduit 36 into chamber 38 is controlled by a valve 42 which is mounted on a free end of a flexible bellows 44, whose opposite end is fixed inside the chamber 38. The total pressure drop between the inlet 11 and the throat of the venturi 12 may be separated into two components, one appearing across restriction 32 and the other across valve 42. As the altitude of the aircraft increases, the bellows 44 expands, thereby moving valve 42 in a closing direction and restricting the flow of air thru the second passage just traced. As the valve 42 is moved toward closed position with increasing altitude, a greater porportion of the total pressure drop takes place across valve 42 and a smaller proportion across restriction 32. The pressure drop across restriction 32 is utilized in the pressure meter 30 as a measure of the mass of the air flowing thru passage 10.

Since the pressure differential produced by a Venturi restriction varies with the velocity of the air, it may be seen that, for a constant mass of air flowing per unit time, the decrease in density of the air causes the venturi to create a higher differential pressure. In order to establish across restriction 32 a differential pressure which is an accurate measure of the mass of air flowing, the bellows operated valve 42 is provided. Upon a decrease in air density, the valve 42 is moved toward closed position, thereby reducing the proportion of the total pressure drop between inlet 11 and the throat of venturi 12 which appears across restriction 32 and is used as a measure of the quantity of air flowing thru passage 10. The bellows 44 and valve 42 cooperate to maintain a pressure differential between chambers 28 and 34 of pressure meter 30 which is substantially a true indication of the mass of air flowing thru the passage 10.

The fuel flowing thru the carburetor comes from a pump or other source of fuel under pressure (not shown). From this source, the fuel flows thru a conduit 46, a pressure regulator valve 48, a conduit 50, a mixture control unit 52, a jet system 54, past an idle valve 56, thru a pressure regulator 58 and a conduit 60 to the fuel discharge nozzle 16.

The pressure regulator 48 includes a casing divided by a flexible diaphragm 62 into a pair of expansible chambers 64 and 66. The diaphragm 62 carries at its center a valve 68, which is balanced against inlet pressure and is biased toward open position by the spring 70. A restriction 72 interconnects the chambers 64 and 66. The pressure in the chamber 66 is the pressure at the outlet of valve 68, while the pressure in chamber 64 is controlled by the pressure meter 30.

The mixture control unit 52 includes a disc valve 74 rotatable by means of a shaft 76 to open and close ports connected to conduit 50 and to a pair of conduits 78 and 80 extending to the jet system 54. When the disc valve member 74 is in the position shown in the drawing, fuel may enter the jet system 54 only thru the conduit 78. The mixture control valve is then said to be in its lean position. If the mixture control valve is rotated so that conduits 78 and 80 are both open, the mixture control is said to be in its rich position. If the valve 74 is rotated so that both conduits 78 and 80 are closed, the mixture control is said to be in its cut-off position.

Fuel entering the jet system 54 thru the conduit 78 may flow thru either a fixed restriction (or jet) 82 or thru a restriction 84 controlled by a poppet valve 86 biased to closed position by means of a spring 88. Fuel entering the jet system 54 thru conduit 80 flows thru a fixed restriction 90. Fuel flowing thru the restrictions 84 and 90 passes thru an additional limiting restriction 92 before passing out of the jet system thru a conduit 94.

The pressure regulator 58 includes a casing divided by a flexible diaphragm 96 into a pair of expansible chambers 98 and 100. The diaphragm 96 carries at its center a valve 102, which is biased toward closed position by a spring 104. The valve 102 is illustrated as being balanced against outlet pressure.

The chamber 98 is connected thru a conduit 105 and the conduit 26, passage 24 and impact tubes 22 to the air in the inlet 11. This connection is to permit free movement of diaphragm 96 without compressing the air in chamber 98. Since the chamber 98 is supplied with air substantially at atmospheric pressure, the spring 104 acts to maintain a pressure greater than atmospheric in the chamber 100. The fuel supplied to the discharge nozzle 16 is therefore always under positive pressure and any tendency of the fuel to vaporize in the conduit 60 or the inlet 16 is minimized.

The pressure meter 30 includes a casing divided by three flexible diaphragms 106, 108 and 110 into four expansible chambers 112, 28, 34 and 114. The fluid connections of chambers 28 and 34 have already been described. The chamber 112 is connected thru a conduit 116 to the conduit 94 in the fuel line downstream from the jet system 54. The chamber 114 is connected thru a conduit 118 to the chamber 64 in the fuel regulator 48.

A portion of the fuel entering chamber 66 of the fuel regulator 48 passes thru restriction 72, chamber 64, conduit 118, chamber 114 of pressure meter 30, and thru a conduit 120 to a drain in the air passage 10. The pressure meter 30 also includes a valve member 122 attached to the diaphragms 106, 108 and 110 and biased to closed position by a spring 124. The valve 122 controls the pressure in chamber 114 and hence the pressure in chamber 64 of fuel regulator 48 by controlling the quantity of fuel flowing from the chamber 114 to the drain passage 120.

Upon an increase in the quantity of air flowing thru the passage 10, the pressure differential between the chambers 28 and 34 is increased, thereby moving the valve 122 in a closing direction and increasing the pressure in chamber 114. The closing movement of valve 122 continues until the increase of pressure in chamber 114 produces an increase in the force acting upwardly on diaphragm 110 sufficient to balance the increase in the force acting downwardly on diaphragm 108 due to the increased air pressure differential.

The increased pressure in chamber 114 is transmitted to chamber 64 of the pressure regulator 48, where it acts on diaphragm 62 in a direction to open the valve 68, thereby increasing the fuel flow thru the carburetor so as to maintain the desired fuel to air ratio.

The quantity of fuel flowing thru the carburetor is determined by the pressure differential across the jet system 54. The pressure upstream from the jet system is regulated by the pressure regulator 48 in accordance with the quantity of air entering the carburetor, in the manner just described. If the pressure downstream from the jet system 54 varies, that variation is communicated thru conduit 116 to the chamber 112 in the pressure meter 30, where it acts on the valve 122 in a direction to produce a balancing change in the pressure upstream from the jet system 54. For example, as the pressure downstream from the jet system decreases, the decrease in pressure is communicated to chamber 112, causing an opening movement of valve 122, thereby decreasing the pressure in chamber 114 of pressure meter 30 and in chamber 64 of pressure regulator 48, thereby causing a closing movement of valve 68 and a decrease in pressure upstream from the jet system 54.

The spring loaded valve 86 controlling the fuel flow thru restriction 84 is provided to increase the fuel and air ratio whenever the pressure differential across the jet system exceeds a particular value which depends upon the loading of spring 88. This increase in the fuel to air ratio causes the engine to run on a richer mixture whenever high power output is required.

When the throttle 14 is closed, or nearly closed, the quantity of air flowing thru the venturi 12 is so small in proportion to the cross-sectional area of the venturi that the pressure differential produced in chambers 28 and 34 of pressure meter 30 is not then an accurate measure of the mass of air entering the engine. Under such circumstances, the spring 124 acting on valve 122 and the spring 70 acting on valve 68 are effective to operate their respective valves in a direction to increase the flow of fuel to the engine. In effect, the pressure regulator 48 is then operated to maintain a fuel supply more than sufficient to produce proper operation of the engine. At the same time, the idle valve 56, which is connected to the throttle by a linkage not shown, comes into operation to restrict the fuel flow in accordance with throttle position. At open throttle position, the idle valve 42 is retracted so that it does not restrict the fuel flow. When the throttle position is such that the pressure meter 30 is no longer accurate, the idle valve 56 is moved to restrict the fuel flow. In effect, the control of the fuel flow is transferred from the pressure meter 30 to the idle valve 56 at low air flows.

*Acceleration control*

Upon acceleration of the engine, an additional supply of fuel is fed into the air flowing thru the passage 10. This additional supply of fuel comes from the conduit 46 and flows thru a conduit 126 and past a valve 128 to the discharge nozzle 18. The valve 128 is operated by an acceleration control 130 which includes a casing 132 separated by a flexible diaphragm 134 into a pair of expansible chambers 136 and 138. The chambers 136 and 138 are interconnected thru a restriction 140. The valve 128 is attached to the center of diaphragm 134. A spring 142 acting on diaphragm 134 biases the valve 128 for movement to closed position.

The chamber 136 is connected thru a restricted passage 144 to the air passage 10 at a point downstream from the throttle 14. The chamber 136 is also connected thru a conduit 146 to the throat of venturi 12. The conduit 146 includes a check valve 148 biased to closed position and adapted to open whenever the pressure in chamber 136 exceeds the pressure at the throat of venturi 12 by a predetermined amount.

Upon an opening movement of the throttle 14, the pressure downstream from the throttle increases. This increased pressure is transmitted thru conduit 144 to chamber 136. Because of restriction 140, the pressure in chamber 138 does not increase as rapidly as the pressure in chamber 136. The pressure differential produced between chambers 136 and 138 then acts on diaphragm 134 in a direction to open valve 128 and increase the fuel supplied to the engine.

As the speed of the engine increases in response to the increased fuel and air supplied, the pressure at the throat of venturi 12 decreases, due to the increased velocity of air flow. When the pressure at the throat of venturi 12 becomes sufficiently less than the pressure in chamber 136 so that valve 148 opens, the pressure differential between chambers 136 and 138 is thereby relieved, and the spring 142 operates the valve 128 to closed position. If the pressure at the throat of venturi 12 does not decrease sufficiently to open valve 148, then valve 128 remains opened until the pressure in chambers 136 and 138 is equalized thru restriction 140.

It may be seen that when accelerating the engine from a substantially closed throttle condition, a longer time is required to reduce the pressure at the throat of venturi 12 sufficiently to open valve 148 than is necessary when accelerating the engine from a part throttle condition. Therefore the increased fuel supply is maintained for a longer period when accelerating from a slow speed than when accelerating from a somewhat higher speed.

While I have shown and described a preferred embodiment of my invention, other modifications will readily occur to those skilled in the art, and I therefore intend my invention to be limited only by the scope of the appended claims.

I claim as my invention:

1. A fuel supply system for an internal combustion engine, comprising means for supplying fuel to said engine, a conduit for air flowing to said engine for combustion purposes, throttle means for controlling the flow of air thru said conduit, Venturi means in said conduit, valve means for controlling an additional supply of fuel for said engine, means biasing said valve means to closed position, a pair of expansible chambers separated by a movable wall, a connection between said wall and said valve so that the pressure in one of said chambers acts to oppose said biasing means and the pressure in the other of said chambers acts to aid said biasing means, a first conduit connecting said chambers and having a restriction therein, a second conduit connecting said one chamber to said air conduit downstream from said throttle means, and a third conduit connecting said one chamber with the throat of said Venturi means, said third conduit having a check valve therein to maintain it closed until the pressure in said one chamber exceeds the pressure at said throat by a predetermined amount.

2. A fuel supply system for an internal combustion engine, comprising means for supplying fuel to said engine; a conduit for air flowing to said engine for combustion purposes, throttle means for controlling the flow of air thru said conduit, a venturi in said conduit; valve means for controlling an additional supply of fuel for said engine; operating means for said valve means including means biasing said valve means to closed position, a pair of expansible chambers separated by a movable wall, a connection between said wall and said valve so that the pressure in the one of said chambers acts to oppose said biasing means and the pressure in the other of said chambers acts to aid said biasing means, a first conduit connecting said chambers and having a restriction therein, and a second conduit connecting said one chamber to said air conduit downstream from said throttle means; said valve operating means being operative in response to an increase in the pressure downstream from said throttle resulting from an opening movement thereof to open said valve means and to hold it open for a period of time after said pressure increase has stopped, said period being dependent upon the amount of said increase and the dimensions of said restriction; a passage connecting said one chamber to the throat of said venturi, a valve in said passage movable in an opening direction by the pressure in said one chamber and in a closing direction by the pressure at said throat, and a spring for holding said last-mentioned valve closed until the difference between the pressures acting thereon exceeds a predetermined value, said passage being effective when the valve therein is opened to reduce the pressure in said one chamber and thereby terminate said additional fuel supply before the expiration of said period of time.

LEIGHTON LEE, II.

REFERENCES CITED

The following references are of record in the file of this patent:

UNITED STATES PATENTS

| Number | Name | Date |
|---|---|---|
| 2,092,685 | Viel | Sept. 7, 1937 |
| 2,103,689 | Mullen | Dec. 28, 1937 |
| 1,841,778 | Beatson | Jan. 19, 1932 |
| 1,858,835 | Mabee et al. | May 17, 1932 |
| 2,136,959 | Winfield | Nov. 15, 1938 |
| 2,232,392 | Kittler | Feb. 18, 1941 |
| 2,277,930 | Mock et al. | Mar. 31, 1942 |
| 2,316,300 | Udale | Apr. 13, 1943 |
| 2,372,356 | Chandler | Mar. 27, 1945 |